Dec. 18, 1934.  E. D. DOYLE ET AL  1,985,081
METHOD AND APPARATUS FOR CONTROLLING ALTERNATING CURRENT GENERATING UNITS
Filed April 1, 1931   5 Sheets-Sheet 1

INVENTORS
Edgar D. Doyle and
Leslie O. Heath
BY Cornelius D. Ehret
their ATTORNEY.

Dec. 18, 1934.  E. D. DOYLE ET AL  1,985,081
METHOD AND APPARATUS FOR CONTROLLING ALTERNATING CURRENT GENERATING UNITS
Filed April 1, 1931    5 Sheets-Sheet 5

Inventors
Edgar D. Doyle and
Leslie O. Heath
Cornelius D. Ehret
By their Attorney Patented Dec. 18, 1934

1,985,081

UNITED STATES PATENT OFFICE 1,985,081

METHOD AND APPARATUS FOR CONTROLLING ALTERNATING CURRENT GENERATING UNITS

Edgar D. Doyle and Leslie O. Heath, Philadelphia, Pa., assignors to Leeds & Northrup Company, Philadelphia, Pa., a corporation of Pennsylvania Application April 1, 1931, Serial No. 526,878

21 Claims. (Cl. 290—4)

Our invention relates particularly to the control of the frequency, or load, or both frequency and load, of alternators supplying current to the same network.

In accordance with our invention, the frequency, and specifically the integrated frequency, of alternators at the same generating station or different stations, is compared with a common frequency standard which may be remote from all stations, or located at one of them.

More particularly, standard frequency current, generated by thermionic tubes under crystal-control for example, is impressed upon conductors connecting the stations, as telephone wires, and at the several stations, it is utilized to run small synchronous motors serving as secondary standards operating in synchronism with one another.

Further in accordance with our invention, the same conductors may be utilized to transmit a characteristically different current, as direct current, or current of another frequency, for controlling the distribution of load between stations.

Preferably, the alternators are each controlled by a balanced system including an electrical network, as an alternating current Wheatstone bridge, responsive to changes in instantaneous frequency; the frequency at which one of said systems is balanced is determined by the integrated difference between the alternator frequency and the common standard and the frequency at which the other systems are balanced is determined by the load relations of the alternators.

Our invention also resides in the methods and systems hereinafter described and claimed.

For an understanding of our invention and for illustration of some of the various forms it may take, reference is to be had to the accompanying drawings in which:

Figs. 3 to 5 illustrate further modifications of the invention for controlling the frequency and load of individual machines.

Figure 1:
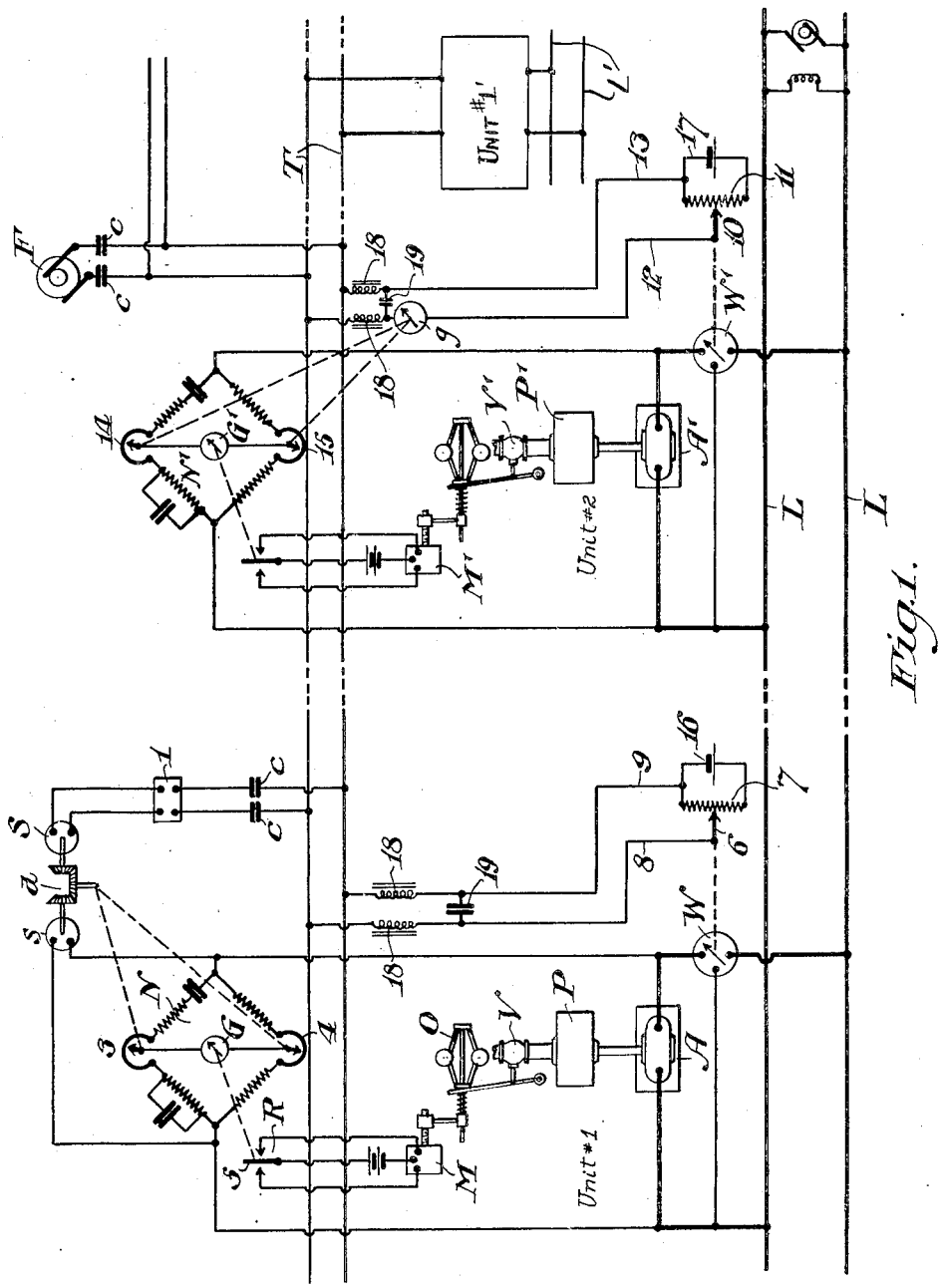
Fig. 1 illustrates diagrammatically a system for controlling the frequency of, and distribution of load between, several alternators.

Referring to Fig. 1, generally unit #1 comprises an alternator A driven from a prime mover P, as a steam turbine, the alternator supplying current to the distributing lines L and L. The network N, which specifically is an alternating current Wheatstone bridge, normally controls the input to the prime mover P to maintain the instantaneous frequency substantially constant. Briefly, when the frequency departs from the value at which the bridge is balanced, current flows through the galvanometer G to move the contact 5 of the reversing switch R in a sense depending upon the sense of unbalance, to effect energization of the pilot motor M which changes the setting of governor O in the proper sense to restore the frequency to normal. This portion of the system, is not per se, our invention, but is described and claimed in Wunsch Patent #1,751,539. With the control thus far described, the instantaneous frequency is held within narrow limits, but after lapse of a substantial period of time, the integrated difference between the actual frequency and the desired frequency becomes undesirably large. To correct for the accumulated or integrated error, the setting of the bridge may be slightly modified in any one of several ways to vary the frequency at which it is balanced, for example, as indicated, the setting of the slide wires 3 and 4 of the bridge, may be varied by movement of the differential gearing $d$ between the synchronous motor $s$ connected to the distribution line L, L, and a constant, or standard speed motor S. The system thus far and broadly described is claimed in co-pending Heath application Serial No. 333,330, filed January 18, 1929.

Heretofore, the integrated frequency standards of different stations were unrelated and were usually clock-trains, with the result that the control systems of the individual stations were not working together and the lack of exact correspondence of the different standards affected the load distribution between stations feeding into the same network, or otherwise made it impractical for them to feed a common network.

In accordance with our invention this difficulty is overcome by utilizing synchronous motors as standards at the several stations, or for the individual machines. These motors are supplied with current from a common source of standard frequency, so that at the different stations the motors serve as secondary standards of identical speed chraacteristics, or in effect there is a common standard for all stations and generating units thereof.

The primary standard F may be for example, a thermionic tube oscillator, multi-vibrator or the like, whose frequency is held constant, as by a quartz crystal held at constant temperature. The frequency of the primary source which may be located at one of the stations, or remote from all of them as at a laboratory equipped with apparatus and personnel capable of precision measurements, may be checked against star-time, to serve as an absolute or precise standard for all the stations of a network, or in fact for stations of different networks, and the frequency of the secondary standards S regardless of their number, or how remotely distributed, will be exactly the same as that of the primary standard F.

The standard frequency current may be transmitted to the different stations in any desired known manner; for example, it may be the modulation frequency of a carrier wave transmitted either through the ether or by wires. As there are usually wires between the stations for communicating purposes, as telephone wires, it is convenient to impress the standard frequency current upon these conductors. For example, in Fig. 1, the primary standard F is connected to the telephone wires T connecting different stations. As the standard frequency current is normally feeble in amplitude and incapable of directly operating a synchronous motor, there is interposed between the secondary standard S and the telephone line T an amplifier 1 of any desired type, for example, a multi-stage thermionic amplifier, which is preceded by a rectifier with or without preceding high frequency amplifiers, as necessary or desirable, if the standard frequency is the modulation frequency of a carrier wave. The use of the telephone lines for transmission of standard frequency current need not interfere with their use for communication or other purposes. Separation of the currents may be effected at their points of utilization in any of the known ways, for example, the condensers c in the standard frequency feeds to and from line T may be of small value to offer high impedance to low frequency currents, though readily permitting the passage of high frequency carrier energy.

Any number of units similar to unit 1 may be controlled from the line T, whether in the same station or any distant station, and regardless of their distance from the standard frequency source F, the standard of comparison at each station is exactly the same as that of all of the other stations. For example, a unit, similar to unit 1 and indicated schematically as unit 1', may be controlled from the lines T and supply current to an independent network L'. A single secondary standard may be utilized in the control of more than one unit of a station, by connecting the differential gearing to the slide wire contacts of several networks.

Insofar as certain aspects of our invention are concerned, the movable contact 5 of the reversing switch R may be directly operated from the differential gear d, and the instantaneous frequency control network N, omitted. However, the arrangement shown is preferred.

The standard frequency need not be the same as the generated frequency. It is only necessary that the differential members of the synchronous motors S, s rotate at the same speed when the generated frequency is of the proper or desired magnitude.

The same line T may be used to control the distribution of load between several units at the same or different stations. A watt-meter W measuring the output of unit 1, is mechanically or otherwise connected, as indicated by dotted line, to a contact 6 movable along the resistance 7 to produce between the conductors 8 and 9 a difference of potential representative of the load or output of the unit. The watt-meter W1 or equivalent, of unit 2 similarly changes the position of a contact 10 adjustable along a resistance 11, to produce a difference of potential between conductors 12 and 13, which is representative of the load of unit 2. The conductors 8, 9 and 12, 13 are so connected by the line T that the voltages are in opposition, so that when they are equal, no current flows through the galvanometer g. When the ratio of the loads is other than that desired, the galvanometer g deflects in one direction or the other, to change the setting of the valve V1, controlling the input energy through the operation of the pilot motor M1. In the particular arrangement disclosed this is effected by a mechanical connection generally indicated by the dotted line from galvanometer g to slide wires 14, 15 for changing their setting for establishing a different frequency at which the frequency controller is balanced.

By properly designing the resistances 6, 11 etc. or the relation between the movements of contact 6, and 10 to the movable structure of wattmeters W and W1, economic load distribution may be effected, as more fully explained in copending Doyle application Serial No. 305,597, filed September 2, 1928.

In the system shown, the conductors 8, 9 and 12, 13 include inductance 18 offering high impedance to the standard frequency currents, each pair being shunted by a condenser 19 offering low impedance to the standard frequency current. The standard frequency is therefore excluded from the load control circuits, while the condensers c exclude the direct current from the standard frequency control circuits. The above described load modifying control comprising the watt-meter W and the associated potentiometer 6, 7 and 16 may be omitted from unit 1'.

Figure 2:
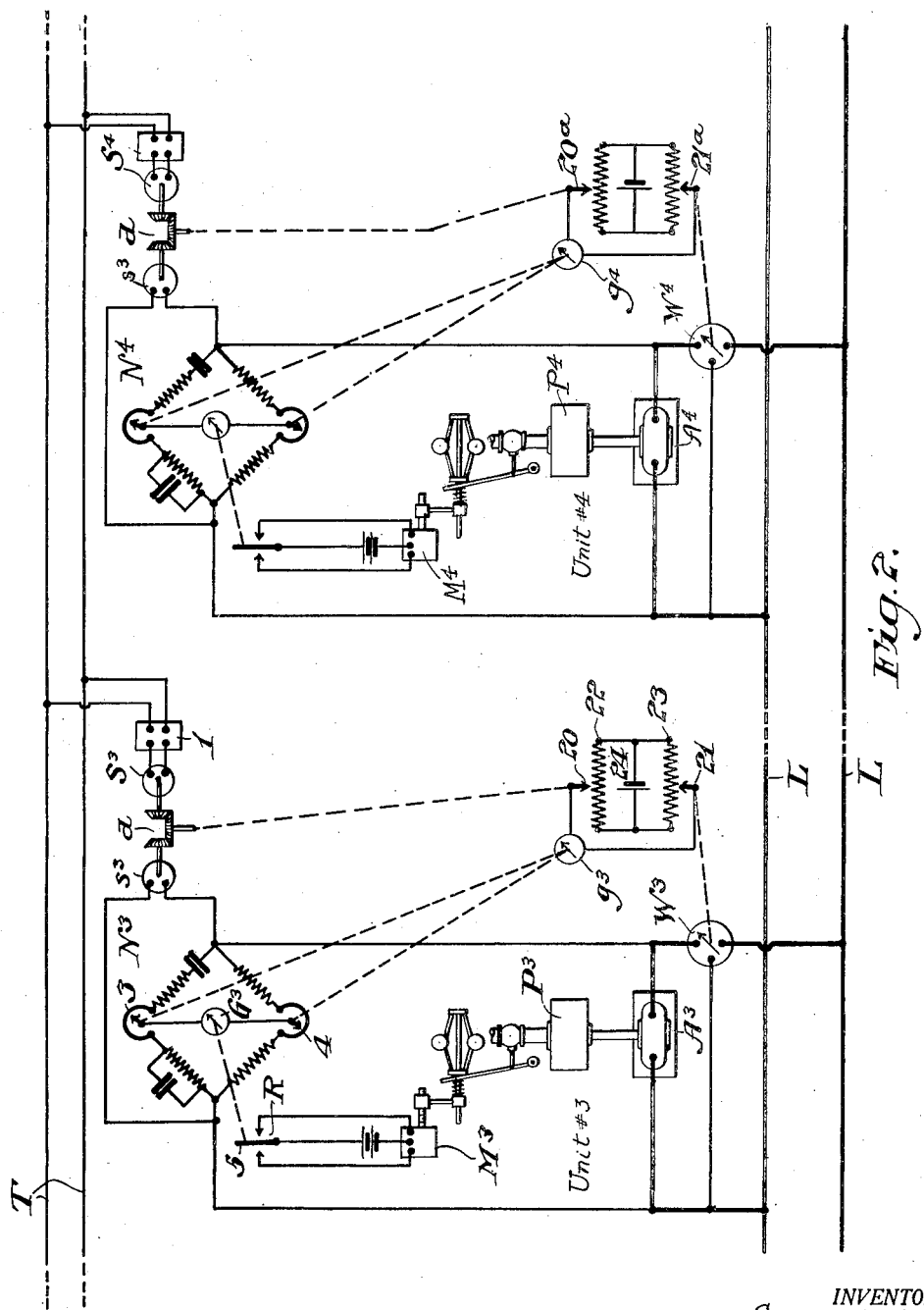
Fig. 2 is a diagram of a modified system in which the alternators are separately load and frequency controlled.

In the modification of the invention shown in Fig. 2, the control conductors T may be considered as supplied by a common source of standard frequency. In this modification, the setting of the slide wires of the balanced network N3, similar to networks N and N1 of Fig. 1, is determined by a galvanometer g3 or equivalent, connected between the movable contacts 20, 21 moved respectively by the differential gearing d and the watt-meter W. In the particular example shown, the contacts 20 and 21 are movable along potentiometer resistances 22 and 23, connected across a battery 24. So long as the difference of potential between the contacts is unchanged, the setting of the slide wires 3 and 4 remains fixed. Upon change of either the output of the machine or movement of the differential gearing, galvanometer g3 deflects to change the slide wire setting of the controlling system. The governor bias is changed accordingly, to establish a predetermined operation of the unit under the changed conditions. The sense and extent of deflection of galvanometer g3 will depend upon the sense and extent of difference between the positions of the two contacts 20 and 21. The galvanometer deflection is zero for all positions of either contact if the other contact is at the same time in corresponding positions; and either contact may be of higher or lower potential than the other depending upon their relative positions. The electrical and mechanical connections are preferably such that for either "low" integrated frequency difference or light load, the setting of slide wires 3, 4 will be changed to increase the instantaneous frequency. However, for a given load, the slide wire setting may vary either way depending upon the magnitude of the integrated frequency difference and conversely, for a given integrated frequency difference including zero difference, the slide wire setting may be changed in either direction depending upon the output of the alternator.

Unit 4 is or may be the same as unit 3, and the corresponding elements are identified by similar reference characters of higher index. If desired, the relation between the extents of movement of contact 21a and 20a by the integrated frequency difference and load effects may be smaller or greater than the same relation between corresponding elements of unit 3 to redistribute the load for change in total load. Each of the units, which may be in the same or different stations, is or may be provided with secondary frequency standard, as S3 and S4, driven from the same source of constant frequency, to insure that the distribution of load between the machines established or predetermined by their control apparatus will not be affected by any dissimilarity between the frequency standards, as was the case when the individual stations used clock-trains for standards.

Insofar as certain aspects of the invention are concerned, galvanometer g3 may operate contact 5 of the reversing switch with omission of network N3.

While constancy of the standard frequency is generally to be desired, it is of greater importance that the standard frequency is common to all stations as the proper relative settings of the contacts 20, and 20a are maintained. With different frequency standards at the different stations even though of high constancy, the contact settings would drift from the proper values and upset the desired load distribution between the stations.

Figure 3:
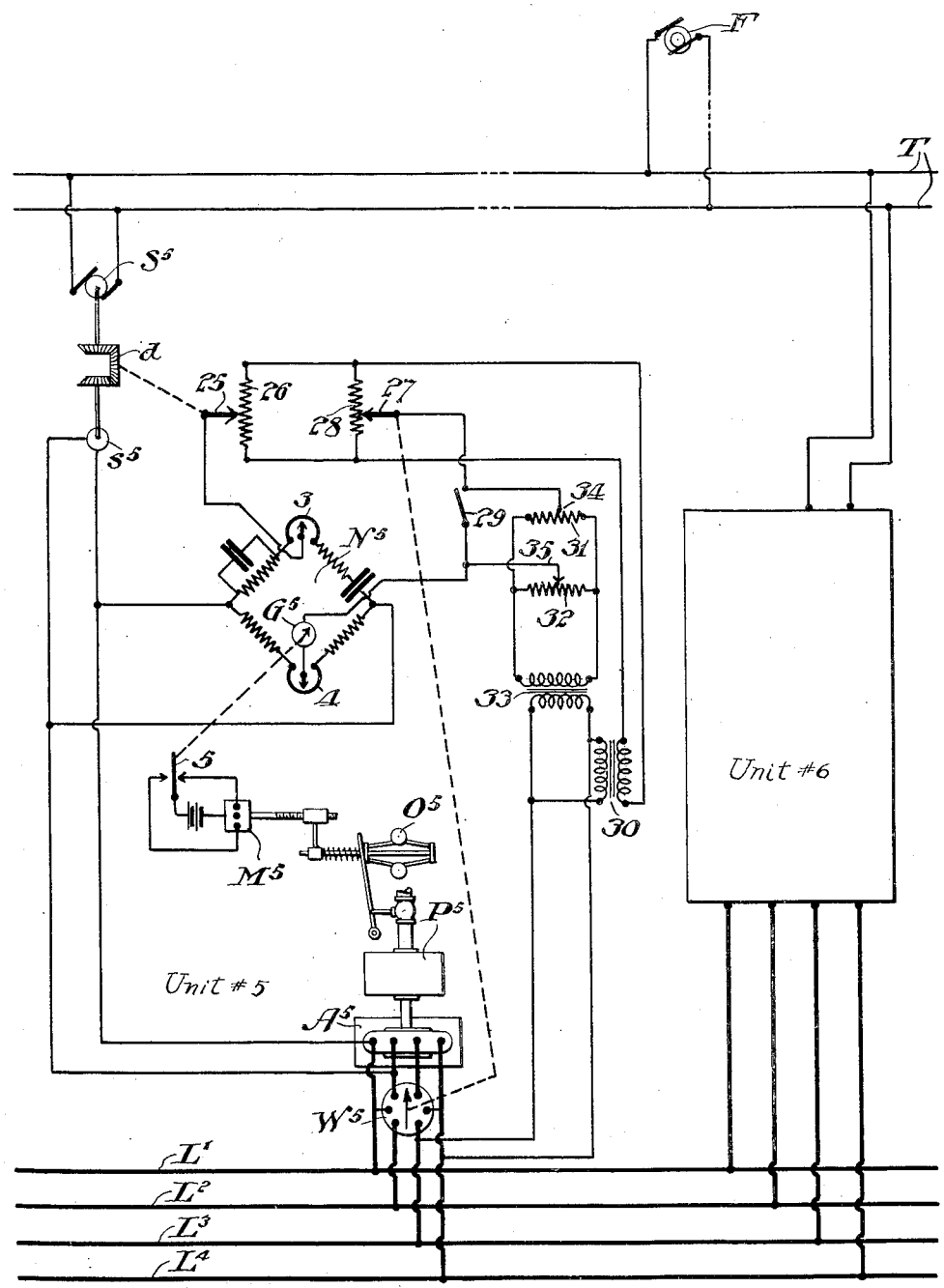

In the system shown in Fig. 3, which is generally similar to that of Fig. 2, the integrated frequency difference and the load of the individual machines are correlated without employing a second galvanometer, such as galvanometer g3 of unit 3. Briefly, instead of shifting the position of the slide wire contacts by a second galvanometer, there is introduced in series in the conjugate arm of the bridge including the galvanometer controlling the position of control contact 5, the difference between two electro-motive-forces whose magnitudes are representative respectively of the integrated frequency difference and the alternator load. In the system specifically illustrated, the differential gearing d changes the position of contact 25 along an impedance or resistance 26, while the watt-meter W5 shifts the position of contact 27 along resistance 28. Alternatively, both contacts 25 and 27 may slide along either of resistances 26, 28 and the other resistance may be omitted. The voltage across both resistances which are in shunt is supplied from the secondary of a transformer 30 whose primary is connected across phase L3, L4. The balanced network N5 is connected across another phase, L1, L2. With the switch 29 closed, the galvanometer G5 is in series with the two resistances, 26, 28 (which are in shunt to each other) in the conjugate conductor. The galvanometer G5 has zero deflection when the load and instantaneous frequency are normal and the integrated frequency difference is zero, or when the unbalanced voltage of the bridge is equal and opposite to the resultant of the voltages representing load and integrated frequency difference. For deflection of the galvanometer in one sense or the other, the setting of the governor is modified in accordance with the joint effects of instantaneous frequency, individual load, and integrated frequency difference.

With the switch 29 open, there is additionally included in series in the galvanometer arm of the bridge the two resistances 31, 32, which are connected in parallel across the secondary of a transformer 33, whose primary is also connected to phase L3—L4. The setting of the contacts 34, 35 of these resistances may be changed manually, to permit adjustment of the biasing effect of load upon the controller. Particularly when adjustable resistances 34 and/or 35 are utilized, the slide wire contacts 3, 4 may be fixed, or non-adjustable. One or more other controlled units, as unit #6, may feed current to the same network.

Figure 4:
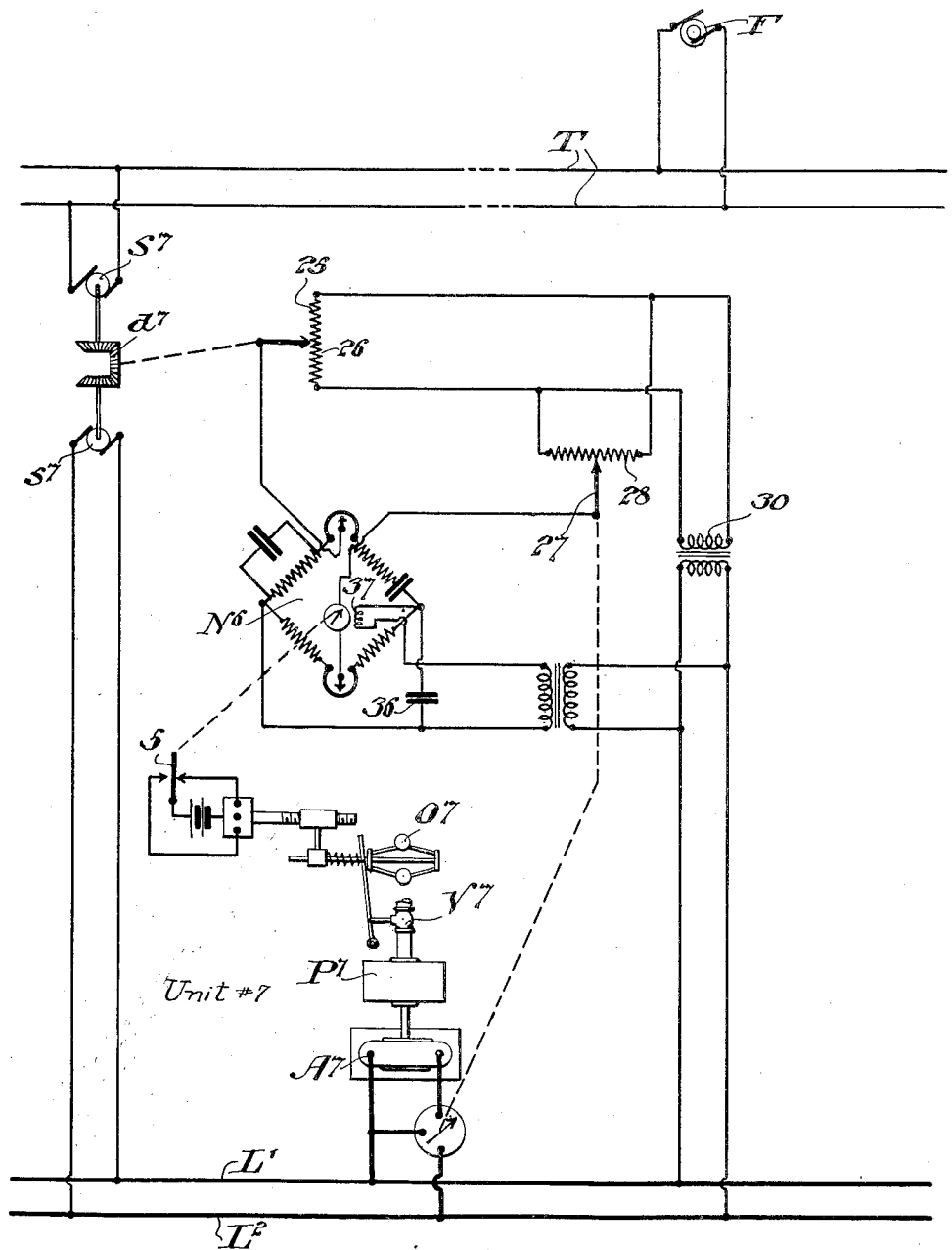
Figure 6:
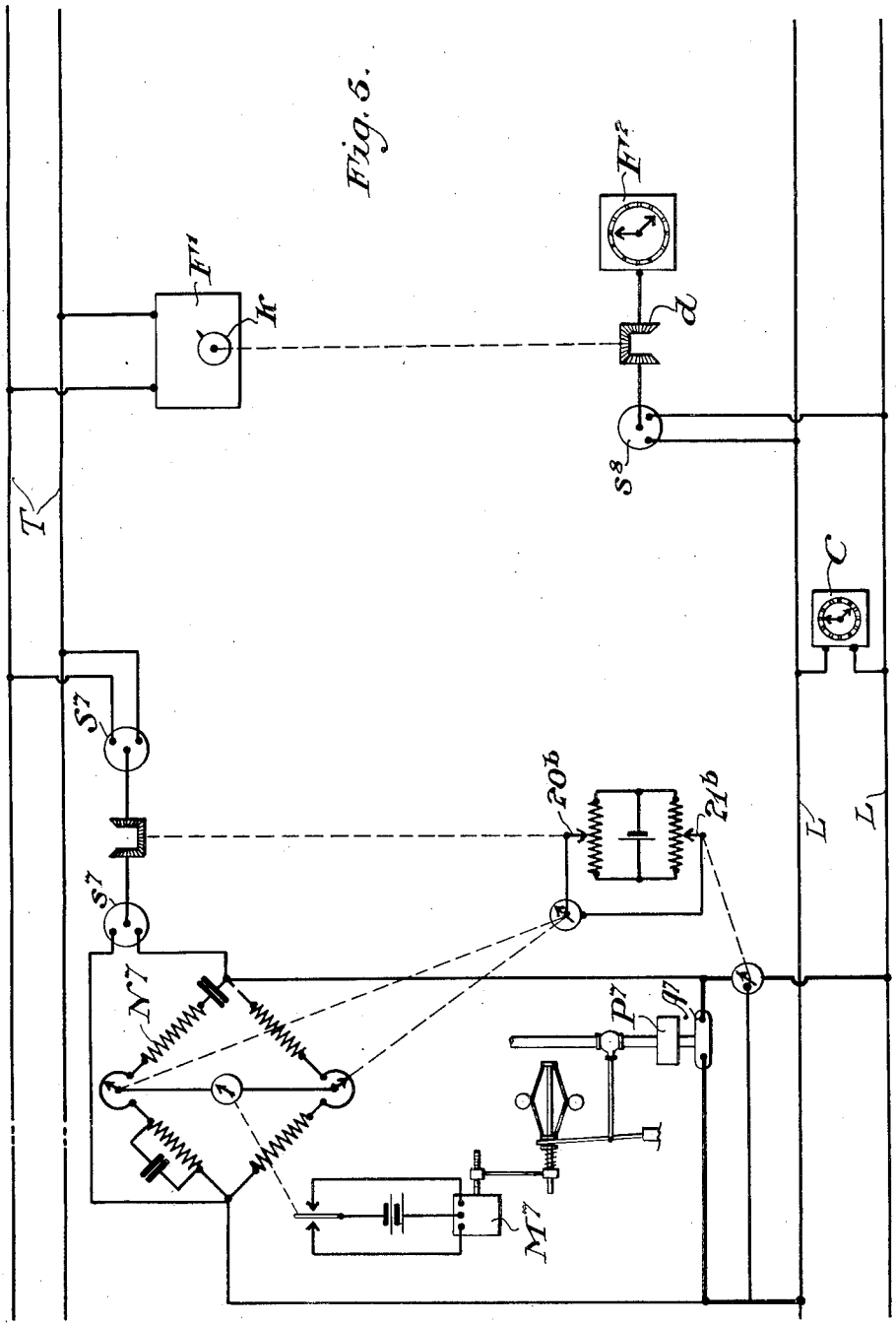

The system of Fig. 4 is similar to that of Fig. 3 except that all the control potentials are obtained from a single phase, which may be one phase of a poly-phase system. In the arrangement specifically illustrated, the proper phase-relation between the potentials is established by a filter network comprising a condenser 36 and inductance 37, which may be in whole or in part the field winding of the galvanometer, which shifts the phase of the voltage applied to the network N6 through approximately 90 electrical degrees. The same result could be obtained, by shifting the phase of the E. M. F.'s introduced into the conjugate arm of the bridge, as by including a phase-shifting device in circuit with the resistances 26, 28 and the secondary of transformer 30. The operation is the same as the operation of the system of Fig. 3 and separate description thereof is unnecessary.

In the modification of Figs. 2 to 4, the speed of the alternators is a function of load or system demand and consequently synchronous clocks connected to the power system do not continuously indicate true time. In the modification shown in Fig. 5, upon departure of system time from true time, the frequency of the source supplying current to the control line T for driving the secondary standard S3, S4 is varied to maintain correspondence of system time with true time.

System time is compared, preferably automatically and continuously with a true time standard F2 of any desired character, as a precision chronometer or an accurately calibrated and controlled crystal oscillator. A differential d between the true time standard and a synchronous motor energized by current of system frequency, responds to the deviation of system time from true time to change the frequency of the source F1 of alternating control current for the secondary standards S3—S7, etc. The mechanism for adjusting the common control frequency of the alternators is generically illustrated by the dotted line extending to the frequency control knob k of source F1.

Change in frequency of source F1 changes the speed of the secondary standards to modify the settings of contacts 20, 20a, 20b, 25, etc., associated with the control systems of the individual alternators, to change the alternator speed in proper sense to reduce the difference between system time, as indicated by synchronous clock C for example, and true time, as indicated by the precision clock F2, to obtain correspondence of true time and system time.

The controlling apparatus in all modifications such as the mechanisms for operating the reversing switches R or shifting the slide wires of the bridges is preferably generally similar to that disclosed in the aforesaid Heath application and Wunsch patent, though other forms may be utilized without departing from the spirit of our invention. As disclosed in the Heath application, instead of shifting the slide wire contacts the position of the control contact 5 may be changed to modify the control action. In both instances, the network, control contacts, galvanometer etc., comprise an electro-mechanical system which is balanced or in equilibrium for certain frequency conditions.

In all figures, the same reference characters have been applied to corresponding elements with the indexes changed for the different generating units and their control systems.

The modifications shown in Figs. 2 to 5 are specifically claimed in co-pending Doyle application Serial No. 536,160, filed May 9, 1931. Features of those modifications common to the system of Fig. 1 are herein generically claimed.

What we claim is:

1. In a system comprising two or more alternators connected in parallel and individual prime movers therefor forming therewith individual generating units, the method of control which comprises individually controlling said units to maintain the instantaneous frequency of the generated current substantially constant, modifying the control of one of said units in accordance with the integrated difference between the frequency of the generated current and a standard, and modifying the control of at least one other of said units in accordance with its load.

2. In a system comprising two or more alternators in parallel and individual prime movers therefor forming individual units, the method which comprises continuously measuring the instantaneous frequency, controlling the individual units to maintain the instantaneous frequency substantially constant, modifying the control of one of said units in accordance with the integrated difference between the frequency of the generated current and a standard, producing an effect whose magnitude is dependent upon the output of the alternator of said one of said units, producing effects whose magnitudes are dependent upon the outputs of other of said alternators, and modifying the control of the units comprising said other alternators to obtain a desired relation between their load effects and the load effect of said one of said alternators.

3. In a system comprising two or more alternators in parallel and individual prime movers therefor forming individual units, the method which comprises continuously measuring the instantaneous frequency, controlling the individual units to maintain the instantaneous frequency substantially constant, modifying the control of one of said units in accordance with the integrated difference between the frequency of the generated current and a standard, producing an effect whose magnitude is dependent upon the output of the alternator of said one of said units, producing effects whose magnitudes are dependent upon the outputs of other of said alternators, and modifying the control of said other alternators to effect balance of their load effects with the load effect of said one of said alternators.

4. In a system comprising two or more alternators in parallel and individual prime movers therefor forming individual units, the method which comprises continuously measuring the instantaneous frequency, controlling the individual units to maintain the instantaneous frequency substantially constant, modifying the control of one of said units in accordance with the integrated difference between the frequency of the generated current and a standard, and modifying the control of other of said units in accordance with change of output of said alternator.

5. In a system comprising two or more alternators in parallel and individual prime movers therefor forming individual units, the method which comprises continuously measuring the instantaneous frequency, controlling the individual units to maintain the instantaneous frequency substantially constant, modifying the control of one of said units in accordance with the integrated difference between the frequency of the generated current and a standard, producing an electro-motive force whose magnitude is dependent upon the output of the alternator of said unit, producing electro-motive forces whose magnitudes are dependent upon the outputs of other of said alternators, and modifying the control of the units comprising said other alternators to effect balance of all of said electro-motive forces.

6. In a system comprising two or more alternators in parallel and individual prime movers therefor forming individual units, the method which comprises varying the input of one of said units in accordance with the integrated difference between the frequency of the generated current and a standard, producing an effect whose magnitude is dependent upon the output of the alternator of said unit, producing effects whose magnitudes are dependent upon the outputs of other of said alternators, and varying the input energy to said other of said alternators to obtain a desired relation of all of said effects.

7. In a system comprising two or more alternators in parallel and individual prime movers therefor forming individual units, the method which comprises varying the input of one of said units in accordance with the integrated difference between the frequency of the generated current and a standard, producing an effect whose magnitude is dependent upon the output of the alternator of said unit, producing effects whose magnitudes are dependent upon the outputs of other of said alternators, and varying the input energy to said other of said alternators to effect balance of all of said effects.

8. In a system comprising two or more alternators in parallel and individual prime movers therefor forming individual units, the method which comprises varying the input of one of said units in accordance with the integrated difference between the frequency of the generated current and a standard, producing an electro-motive force whose magnitude is dependent upon the output of the alternator of said unit, producing electro-motive forces whose magnitudes are dependent upon the outputs of other of said alternators, and varying the input energy to said other of said alternators to effect balance of said electro-motive forces.

9. In a system comprising two or more alternators in parallel with individual control systems each including an alternating current Wheatstone bridge, the method which comprises varying the frequency at which one of said bridges is balanced in accordance with the integrated departure of the frequency of the generated current from a standard, and varying the frequency at which the other bridges are balanced to effect or maintain a desired ratio between the output of the alternator controlled by said one of said bridges and the outputs of the other alternators.

10. A system comprising two or more alternating current generating units at different stations, each unit including an alternator and a prime mover, a source of standard frequency current, means for transmitting said standard frequency current to said different stations, synchronous motors at said different stations driven by said standard frequency current, synchronous motors at said stations driven by the generated current, and mechanism for controlling the input energy of prime movers of different stations each in accordance with the difference between the revolutions of the standard frequency synchronous motor and the generated frequency synchronous motor.

11. A system comprising two or more alternating current generating units at different stations each unit including an alternator and a prime mover therefor, control systems for said units, each comprising means responsive to changes in instantaneous frequency for varying the input energy of the prime mover of the unit, a source of standard frequency current, means for transmitting said standard frequency current to said different stations, and means at each of said stations for integrating the difference between the standard frequency and the frequency of the generated current and modifying the control action of the corresponding system in accordance with the integrated difference.

12. A system comprising two or more alternating current generating units at different stations each unit including an alternator and a prime mover therefor; control systems for said units each comprising a balanced network, means responsive to unbalance of the network upon change of instantaneous frequency of the generated current, and means operated by said responsive means to vary the input energy of the prime mover of the unit; a source of standard frequency current, means for transmitting said standard frequency current to said different stations, synchronous motors at said stations driven by said standard frequency current, synchronous motors at said stations driven by the generated current, and differential means at each of said stations for modifying the action of the corresponding control system in accordance with integrated difference between the speeds of the standard frequency motor and the generated frequency motor of the station.

13. A control for an alternating current generating unit including an alternator and a prime mover therefor, comprising a system for varying the input energy to said prime mover and balanced at a desired frequency of current generated by said alternator, a synchronous motor driven by the generated current, a source of standard frequency current, a synchronous motor driven by said current, and differential means for changing the frequency at which said system is balanced in accordance with the integrated difference between the speed of said motors.

14. A system comprising two or more stations having one or more alternating current generating units, frequency control mechanisms for said individual units, a communication line between stations, means for impressing current of standard frequency on said line, means responsive to the integrated difference between the standard and generated frequencies for modifying at least one of said frequency control mechanisms, and a load control system for establishing predetermined load relations between two or more units at different stations including said communication line.

15. A system comprising individual generating units each comprising an alternator and a prime mover therefor, individual control means for said units responsive to changes in instantaneous frequency for varying the prime mover inputs to maintain the instantaneous frequency substantially constant, means responsive to the integrated difference between the frequency of the generated current and a standard frequency for modifying the action of one of said control means, and means responsive to the individual load changes of at least another of said units for modifying the effect of its said control means.

16. A system comprising individual generating units each comprising an alternator and a prime mover therefor, individual control means for said units responsive to changes in instantaneous frequency of the generated current for varying the prime mover inputs to maintain the instantaneous frequency substantially constant, means responsive to the integrated difference between the frequency of the generated current and a standard frequency for modifying the action of one of said units, means producing an effect varying in accordance with the changes in load of said one of said units, means producing effects varying in accordance with the changes in individual load of the other of said units, and means for modifying the action of the said control means of said other units in response to unbalance between their said individual load effects and said load effect of said one of said units.

17. A system comprising individual generating units each comprising an alternator and a prime mover therefor, individual control means for said units responsive to changes in instantaneous frequency for varying the prime mover inputs to maintain the instantaneous frequency substantially constant, means responsive to the integrated difference between the frequency of the generated current and a standard frequency for modifying the action of the said control of one of said units, and means responsive to the changes in load of said one of said units for modifying the action of the said control means of the other of said units.

18. A system comprising individual generating units each comprising an alternator and a prime mover therefor, individual control means for said units responsive to changes in instantaneous frequency for varying the prime mover inputs to maintain the instantaneous frequency substantially constant, means responsive to the integrated difference between the frequency of the generated current and a standard frequency for modifying the action of the said control means of one of said units, means responsive to the load changes of said one of said units for varying an electromotive force whose magnitude is determined by the load of said unit, means for producing other electromotive forces each determined by and varying in accordance with the loads of the other of said units, and means for modifying the action of each of the other of said control means responsive to said electromotive forces jointly.

19. A system comprising individual generating units each comprising an alternator and a prime mover therefor, individual control means therefor each comprising a Wheatstone bridge responsive to changes in the system frequency for varying the input of the associated prime mover, means responsive to the integrated difference between the system frequency and a standard frequency for varying the frequency for which the control bridge of one of said units balanced, means for producing effects determined by and varying in accordance with the loads of the individual units, and individual means for varying the frequency for which each of the other bridges is balanced each responsive to unbalance between the said load effect of the associated unit and the load effect of said one of said units.

20. A system comprising two or more alternating current generating units at different stations, individual control means for said units responsive to changes in instantaneous frequency of the generated current for varying the inputs to said units to maintain the instantaneous frequency substantially constant, a source of standard frequency current, means for transmitting said standard frequency current to said different stations, and individual means at said different stations each responsive to the integrated difference between the system frequency and the common standard frequency for modifying the action of said individual control means.

21. A system comprising individual generating units each comprising an alternator and a prime mover therefor, a source of standard frequency current, conductors for transmitting said current, means for controlling the input of one of said units responsive to the integrated difference between the frequency of the current transmitted by said conductors and the system frequency, means responsive to the individual loads of said units for producing electromotive forces, means including said conductors for connecting the said electromotive force corresponding to the load of said one of said units in opposition to the electromotive forces corresponding to the loads of the other units, and means responsive to unbalance of said electromotive forces for varying the input to the other of said units.

EDGAR D. DOYLE.
LESLIE O. HEATH.